1,807,215

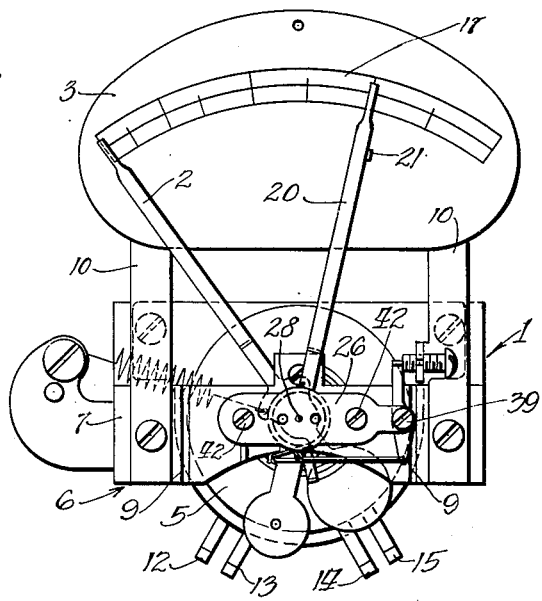
May 26, 1931.  L. D. JOHNSON  1,807,215
METER
Filed Aug. 6, 1930
Inventor
Lewis Dana Johnson
By Brown, Jackson, Boettcher & Dienner
Attys Patented May 26, 1931

UNITED STATES PATENT OFFICE

LEWIS DANA JOHNSON, OF SPRINGFIELD, ILLINOIS, ASSIGNOR TO LINCOLN METER COMPANY, OF SPRINGFIELD, ILLINOIS, A CORPORATION OF ILLINOIS

METER

Application filed August 6, 1930. Serial No. 473,352.

The present invention relates to indicating instruments and more particularly to those types of instruments which are provided with a freely rotatable hand adapted to indicate the maximum position attained over any given period by the indicating hand proper of the instrument. Such maximum hands are usually returned to zero position at any desired time by manually moving them to that position.

Heretofore a number of different arrangements have been devised for the purpose of holding the maximum hand in any given position against accidental displacement, as by vibration imparted to the instrument as a whole due to adjacent moving machinery and other causes, but so far as I am aware such arrangements have not been generally successful, some of them allowing the maximum hand to creep one way or the other under the effect of vibration so that the maximum indication had was not accurate.

It is the principal object, therefore, of the present invention to provide means for applying friction to the maximum or idle pointer so as to hold it steady under vibration and shock after being installed, yet sufficiently free to allow it to be moved by the indicator hand proper when the latter is advanced over the scale of the instrument.

More specifically, one object of the present invention is to provide a friction element encircling a member movable with the maximum or idle hand together with spring means connected to each end of the friction element so that movement of the maximum hand in either direction is resiliently restrained with substantially the same force. Thus, there is no tendency for the hand to creep in either direction when the instrument is subjected to vibration or the like.

Another object of the present invention is the provision of improved means for adjusting the tension of the spring means which holds the friction element in contact with the member movable with the maximum hand.

Other objects and advantages of the present invention will be apparent after a consideration of the following detailed description of the preferred embodiments, taken in conjunction with the accompanying drawings, in which:

Figure 1 is a front view of an indicating instrument showing the application of the present invention, a thermal demand meter being chosen as illustrative of the type of indicating instrument for which the present invention is particularly adapted;

Figure 2 is a perspective detail view showing the arrangement of a friction device embodying the features of the present invention;

Figure 3 is a view similar to Figure 2 but showing a modified form of friction device; and Figure 4 is a view similar to Figure 3 and showing another modified form of the present invention.

Referring now to the drawings, the reference numeral 1 indicates in its entirety, a thermal demand meter, with which the invention herein shown is applied. Indicating instruments of this type are well known in the art and since the indicating instrument per se forms no part of the present invention it has not been illustrated in the drawings in any great detail. The instrument indicated is adapted to indicate current flow in amperes, the indicating hand 2 being connected to mechanism responsive to current flow and playing over a dial 3 graduated to indicate the flow of current in amperes. The operating mechanism is indicated generally by the reference numeral 5, and is shown as mounted within a framework 6 comprising a pair of spaced longitudinal frame members 7 and a connecting member 8. Secured to offset portions 9 are a pair of standards 10 to which the dial 3 is secured in any desired manner, as by screws, rivets and the like (not shown).

Leads 12, 13, 14 and 15 form a part of the operating mechanism 5 and are adapted for suitable connection to the electric circuits it is desired to meter. As is generally understood, in an instrument of this sort the hand 2 moves back and forth over the dial 3 in response to current flow and, in the particular instrument illustrated, the dial 3, having the graduations 17 indicate the current consumption in amperes.

In meters of the maximum demand type there is usually provided a freely rotatable or idle indicating hand 20 which is adapted to be moved in one direction, that of increasing current consumption, by the indicating hand proper 2 but which is free to remain in the highest position attained by the indicating hand 2 during any given period of operation, that is, the maximum hand 20 follows the indicating hand 2 as the latter moves over the scale 17 to indicate an increased current consumption but does not follow the hand 2 in its retrograde movement. To achieve this result the maximum hand 20 is provided with a tab or projection 21 projecting from the hand 20 so as to be engaged by the hand 2 as the latter advances over the scale 17. Of course, when the hand 2 moves backward over the scale 17 the hand 20 remains in the maximum position.

Instruments of this sort are subjected to considerable vibration originating from adjacent moving machinery and other causes, all of which operate to disturb the maximum setting of the hand 20. The present invention is principally concerned with an improved construction of holding means operating to yieldingly retain the maximum hand 20 in any of its maximum indicating positions.

Referring now more particularly to Figure 2, it will be seen that the frame member 8 is provided with a pair of raised bosses 24, each having threaded apertures 25. These bosses 24 are adapted to receive and support a plate 26, see Figure 1, overlying and spaced a small distance forwardly of the face of the frame member 8. Preferably, the maximum indicating hand 20 is pivotally mounted upon the frame member 8 and the plate 26 and for this purpose the hand is provided with a staff or pinion 28, one end of which is received in an opening formed centrally of the frame member 8 while the other end is received in an aperture in the plate 26. One of the bosses 24 is provided with a stop 24a to limit the movement of the hand 20.

Preferably, the pinion 28 is rigidly secured to the indicating hand 20, and rigid with the pinion 28 and the hand 20 is a drum or friction member 30 provided with a circumferential groove for a purpose to be described later. While I have described the pinion 28 as rigid with the drum 30 and the hand 20 it is to be understood that, if and where desired, the pinion 28 may be rigid with respect to the frame member 8 and the drum and indicating hand 20 journaled on the pinion 28. Under such conditions, it may be desirable to dispense entirely with the plate 26 and to mount the indicating hand 20 and friction drum 28 on a pin or stud on the frame member 8.

In order to frictionally hold the maximum indicating hand 20 in any given position I provide a friction band 32 encircling the drum 30 and positioned in the groove therein. It will thus be clear that as long as the friction band 32 is held in the groove in the friction drum 30 the band will exert a force tending to hold the maximum indicating hand 20 in any given position. Only a slight amount of force is necessary or desirable since the hand 20 must be adapted to be moved by the indicating hand proper 2, yet such force must be sufficient to maintain the maximum hand 20 in its position regardless of vibration and other causes tending to displace the same.

The improved means I have provided for applying this small amount of force to the friction band 32 and the drum 30 preferably takes the form of a pair of relatively long springs 34 and 35, as indicated in Figure 2. One end of each of these springs is provided with a loop to which the ends of the friction band 32 are respectively connected, as by tying or otherwise, and, as best shown in Figure 2, the friction band 32 has its ends crossed so as to more completely encircle the drum 30.

Both of the springs 34 and 35 are rigidly secured to a pivoted supporting member 37 by soldering or otherwise, and this supporting member 37 is pivoted to the frame 6 by means of a screw 39, see Figure 1, threaded into a threaded boss 40 on the frame member 8, as shown in Figure 2. The screw 39 cooperates with other screws 42 in securing the plate 26 to the frame member 8, as indicated in Figure 1.

The upper end 44 of the pivoted supporting member 37 is provided with an offset projection 45 normally lying adjacent to a bracket 46 secured to or forming a part of one of the standards 10. Preferably, the bracket 46 is split and threaded through the split portion to receive an adjusting screw 48, the inner end of which contacts with the projection 45. By having the bracket 46 split the portions thereof can be biased to apply a force operating to hold the adjusting screw 48 in any position therein.

The operation of the mechanism so far described is substantially as follows. When the instrument is installed the maximum indicating hand 20 is manually set to zero position and overlying the hand 2 by manual means (not shown) forming no part of this invention. When the instrument is connected to the line the hand 2 moves over the scale 17 in response to the consumption of current, the hand 20 moving with the hand 2 as the latter advances over the scale 17 but remaining in its maximum position to indicate the maximum demand made upon the current source. As the hand 20 moves over the scale 17 the drum 30 moves within the encircling loop of the friction band 32 but as soon as the force positively moving the hand 20, that is, the hand 2, ceases the friction between the band 32 and the drum 30 is sufficient to maintain the hand 20 in the position in which it is left, the springs 34 and 35 constantly tending to tighten and hold the band 32 in frictional contact with the drum 30. The force of friction between these parts is not, however, sufficient to have any appreciable effect upon the movement of the indicating hand 2 nor any effect in preventing the manual return of the maximum indicating hand 20 to its zero position.

Preferably, the springs 34 and 35 are so arranged as to exert a constant pull upon both ends of the friction band 32, as will be admitted by referring to Figure 2. This tension may be adjusted from time to time as may be necessary by simply loosening the screw 39 and turning the adjusting screw 48 in one direction or the other, depending on whether the tension exerted by the springs 34 and 35 is to be increased or decreased. As illustrated, the springs 34 and 35 are of substantial length and are formed of spring wire so that a light yet positive force is exerted upon the friction band 32. The advantages of making these springs 34 and 35 of substantial length are two-fold. First, by making these springs relatively long the force exerted by each of them is practically uniform throughout a considerable range of deformation and, second, these springs are, in effect, of practically the same length so that the force exerted by each equals substantially the force exerted by the other. In addition, by virtue of their substantial length their tension can be nicely adjusted to a fine degree by the steps indicated above. As will be understood by referring to Figure 2, when the pivoted supporting member 37 is caused to be rotated in a counterclockwise direction a greater tension will be exerted by the springs 34 and 35 and, on the other hand, when the pivoted supporting member 37 is rotated in a clockwise direction the tension exerted by the springs 34 and 35 will be relaxed. When the supporting member 37 is in proper position the screw 39 may be tightened to rigidly secure the member 37 to the frame 6.

Figure 3 of the drawings indicates a somewhat simpler modification of the invention as embodied in the structure illustrated in Figure 2. Figure 3 illustrates the present invention as embodied in a single spring 50, one end of which is secured to the frame member 8 by an adjusting screw 51. Preferably, one end of the spring 50 is secured to a washer 52 and the tension of the spring 50 may be regulated by loosening the screw 51 and turning the washer 52. The other end of the spring 50 is provided with two loops 54, one end of the friction band 32 being secured to one of the loops and the other end of the friction band being secured to the other loop 54. It is to be noted that the spring 50 is substantially the same length as the springs 34 and 35 so that the above named advantages accruing from the use of springs of such length are also realized by the use of the spring 50, the only difference being that instead of using two springs the modification illustrated in Figure 3 utilizes a single spring to secure substantially the same results.

The modification illustrated in Figure 4 resembles that illustrated in Figure 2 somewhat more so than does the modification just described. In this case, the pivoted supporting member 37 is made quite long and is pivotally mounted on the frame member 8 at a point nearer the axis of the maximum indicating hand 20. The means pivotally supporting the member 37 of Figure 4 to the frame member 8 may take the form of a screw 56 threaded into the frame member 8 in any desired manner. One end 60 of the pivoted supporting member lies substantially underneath the pivotal axis of the supporting hand 20 and is provided with a turned end 61 to which is rigidly secured as by soldering, clips, or the like, the spring means 62. Preferably, the spring means 62 take the form of a single spring having arms 63 of equal length extending in opposite directions from the end 61 of the pivoted supporting member. The outer ends of these arms 63 are each provided with a loop to which is secured the ends of the friction band 32. While these arms 63 are shown as somewhat shorter than the springs 34 and 35, or the spring 50, it is to be noted that they are of exactly the same length so that exacly the same tension is exerted upon each end of the friction band 32. The pivoted supporting member 37 of the modification illustrated in Figure 4 may be adjusted by the same means 48 described above in connection with the embodiment of the present invention illustrated in Figure 2.

While I have shown and described the preferred constructions embodying the present invention, it is to be understood that widely different means may be employed in the practice of the broader aspects of my invention. For example, in utilizing the construction illustrated in Figure 2, it may be desired to provide the springs 34 and 35 with loops exactly under the pivot axis defined by the spindle 28, in which case the lengths of these springs will be exactly the same but the friction band 32 will not contact with the circumference of the drum 30 to quite the same extent as it does when the springs are arranged as shown in Figure 2. It is to be further understood that the friction band 32 may be formed of any desired or available material and while preferably this friction member is made of silk any other desired fabric may be employed, or, in fact, under certain conditions a metallic flexible band may be employed if desired.

Having described my invention and illustrated the same in the accompanying drawings, what I claim and desire to secure by Letters Patent is:

1. In a meter instrument having a freely rotatable indicator, means for holding said member in a given position comprising a friction member movable with said indicator, a second member adapted to frictionally contact with the circumference of said first member uniformly on both sides thereof, and resilient means for yieldingly maintaining said contact.

2. In a meter instrument having a freely rotatable indicator, means for holding said member in a given position comprising a friction member movable with said indicator, a second member adapted to encircle said first member, and spring means resiliently connected with said second member and adapted to urge the second member against the friction member at a plurality of points with a uniform pressure.

3. In a meter instrument having a freely rotatable indicator, means for holding said member in a given position comprising a friction member movable with said indicator, an elongated second member adapted to encircle said first member, and a spring connected to each end of said second member.

4. In a meter instrument having a freely rotatable indicator, means for holding said member in a given position comprising a friction member movable with said indicator, a second member adapted to encircle said first member and comprising a fricton band adapted to be looped about the movable friction member, and spring means connected with both ends of said element and exerting a pull on the band in both directions.

5. In a meter instrument having a freely rotatable indicator, means for holding said member in a given position comprising a friction member movable with said indicator, a second member adapted to encircle said first member, spring means resiliently connected with said second member and adapted to cause the second member to apply uniform yielding tension to said friction member, and means for adjusting the tension of said spring means.

6. In an indicating instrument, an indicating hand movable in response to the quantity to be indicated, a second hand movable by the first hand in one direction only, and means for holding said second hand in any given position, said means comprising a drum movable with said second hand, a friction band encircling said drum, and adjustable means for resiliently anchoring either end of said band.

7. In an indicating instrument, an indicating hand movable in response to the quantity to be indicated, a second hand movable by the first hand in one direction only, and means for preventing said second hand from creeping away in either direction from any given position under the influence of vibration, said last named means comprising a friction band resiliently restraining movement of the second hand in either direction.

8. In an indicating instrument, in combination, a maximum hand, a drum movable therewith a friction element looped around said drum and in frictional contact therewith, and spring means connected to each end of said element and tensioned to apply substantially equal force to the two ends of said element, whereby as the maximum hand is moved in either direction said element frictionally holds the hand in position.

9. In an indicating instrument, in combination, a maximum hand, a drum movable therewith, an elongated friction element partially encircling said drum and in frictional contact therewith, spring means connected to each end of said element and applying substantially equal tension to said ends, whereby as the maximum hand is moved in either direction said element frictionally holds the hand in position, a supporting member for said spring means, and means to adjust the position of said last named member.

10. In an indicating instrument, in combination, a maximum hand, a drum movable therewith, a friction cord encircling said drum and in frictional contact therewith, spring means connected to each end of said cord and applying substantially equal tension to the ends of the cord, whereby as the maximum hand is moved in either direction said cord frictionally holds the hand in position, a pivoted supporting member for rigidly supporting said spring means, and manually operable screw means for adjusting the position of said last named member.

11. In an indicating instrument, in combination, a maximum hand, a drum movable therewith, an elongated friction element encircling said drum and in frictional contact therewith, and a spring connected to each end of said element, said springs being of substantially the same length and each applying substantially equal tension to said element.

12. In an indicating instrument, in combination, a maximum hand, a drum movable therewith, a friction element looped around said drum and in frictional contact therewith, and a spring connected to each end of said element, said springs being of substantially the same length, there being a loop on each spring to which the respective ends of the friction element are secured, and each applying substantially equal tension to said element, whereby as the maximum hand is moved in either direction said element frictionally holds the hand in position.

13. An indicating instrument comprising, in combination, a maximum hand, a drum movable therewith, an elongated friction band encircling said drum and arranged in frictional contact therewith, a plurality of springs one connected to each end of said friction band, said springs being of substantially the same length and each applying substantially the same amount of tension to said band, and an adjustable support to which a portion of each of the springs is rigidly secured.

14. An indicating instrument comprising, in combination, a meter instrument, a freely rotatable indicator member operated thereby, a drum secured to said freely rotatable member and having a grooved periphery, a flexible cord at least partially encircling the grooved drum, and springs means adjustably supported and arranged to pull with equal tension upon both ends of said cord to frictionally hold said rotatable member in indicating position.

15. An attachment for indicators comprising the combination with a meter instrument, a freely rotatable indicator member operated by the instrument, a drum secured to said indicator member and having means providing a grooved periphery, a flexible friction band having its intermediate portion looped around the grooved drum, spring means connected to the free ends of said band, and a rotatable adjusting member supporting said spring means and adjustable to apply different degrees of tension to both ends of the friction band.

In witness whereof, I hereunto subscribe my name this 2nd day of August, 1930.

LEWIS DANA JOHNSON.